US012226889B2

(12) United States Patent
Stockwell (10) Patent No.: US 12,226,889 B2
(45) Date of Patent: Feb. 18, 2025

(54) FOLDING STAND WITH SECURING MECHANISM (71) Applicant: SawStop Holding LLC, Tualatin, OR (US)

(72) Inventor: Benjamin J. Stockwell, Tuner, OR (US)

(73) Assignee: SawStop Holding LLC, Tualatin, OR (US)

( * ) Notice: Subject to any disclaimer, the term of this patent is extended or adjusted under 35 U.S.C. 154(b) by 340 days.

(21) Appl. No.: 17/407,406

(22) Filed: Aug. 20, 2021

(65) Prior Publication Data
US 2022/0063084 A1 Mar. 3, 2022

Related U.S. Application Data (60) Provisional application No. 63/072,405, filed on Aug. 31, 2020.

(51) Int. Cl.
B25H 1/04 (2006.01)
F16M 11/38 (2006.01)

(52) U.S. Cl.
CPC .............. B25H 1/04 (2013.01); F16M 11/38 (2013.01)

(58) Field of Classification Search
CPC ............ B25H 1/04; B25H 1/08; F16M 11/38
See application file for complete search history.

(56) References Cited

U.S. PATENT DOCUMENTS

| 1,166,865 | A | 1/1916 | Stone |
| 2,096,994 | A | 10/1937 | Millen |
| 2,155,896 | A | 4/1939 | Goldman |
| 3,655,212 | A | 4/1972 | Krass et al. |
| 4,192,480 | A | * | 3/1980 | Schmidt ................. F16M 11/38 248/436 |
| 4,611,823 | A | 9/1986 | Haas |
| 4,728,118 | A | 3/1988 | Haas |
| 4,967,672 | A | 11/1990 | Leather |
| 4,969,496 | A | 11/1990 | Romans |
| 5,087,013 | A | 2/1992 | Gress et al. |
| 5,320,150 | A | 6/1994 | Everts et al. |

(Continued)

FOREIGN PATENT DOCUMENTS

| DE | 20202397 | 2/2001 |
| EP | 0532132 | 3/1993 |

(Continued)

OTHER PUBLICATIONS

Babcock youtube video dated May 24, 2020 titled "Overview of Craftsman 10' Table Saw CMXETAX69434502", https://www.youtube.com/watch?v=uGX7y0n56Eg (Year: 2020).*

(Continued)

Primary Examiner — Eret C McNichols
Assistant Examiner — Ding Y Tan (57) ABSTRACT A folding stand with a pivoting securing mechanism to secure an object to the stand is disclosed. The stand may include two rails in the same horizontal plane and a securing mechanism that pivots about an axis which is perpendicular to that horizontal plane. The securing mechanism may be positionable in a locked and an unlocked position. The securing mechanism may include one or more arms that extends over a portion of the object in the locked position.

5 Claims, 6 Drawing Sheets

(56) References Cited

U.S. PATENT DOCUMENTS

| | | |
|---|---|---|
| 5,560,582 A | 10/1996 | Beelen |
| 5,927,745 A | 7/1999 | Cunningham |
| 6,360,797 B1 | 3/2002 | Brazell et al. |
| 6,471,220 B1 | 10/2002 | Babb |
| 6,530,583 B1 | 3/2003 | Mueller |
| 6,546,978 B2 | 4/2003 | Thoman |
| 6,578,856 B2 | 6/2003 | Kahle |
| 6,607,015 B1 | 8/2003 | Chen |
| D486,504 S | 2/2004 | Huang |
| 6,722,293 B2 * | 4/2004 | Lee ................. A47B 3/02 |
| | | 108/118 |
| 6,886,836 B1 | 5/2005 | Wise |
| 6,899,306 B1 | 5/2005 | Huang |
| 6,942,229 B2 | 9/2005 | Brazell et al. |
| D519,747 S | 5/2006 | Wu |
| D523,041 S | 6/2006 | Wise |
| 7,055,847 B2 | 6/2006 | Miller et al. |
| 7,059,616 B2 | 6/2006 | Wu |
| 7,077,421 B2 | 7/2006 | Wu |
| 7,213,829 B2 | 5/2007 | Wu |
| 7,222,865 B2 | 5/2007 | Chen et al. |
| D550,476 S | 9/2007 | Liu et al. |
| 7,278,646 B2 | 10/2007 | Chuang |
| 7,294,789 B1 * | 11/2007 | Watthanasintham ................. |
| | | F16L 3/1215 |
| | | 174/64 |
| 7,308,858 B2 | 12/2007 | Lo et al. |
| 7,331,596 B2 | 2/2008 | Tiramani |
| 7,648,155 B1 | 1/2010 | Wise |
| 7,849,966 B2 | 12/2010 | Chiu |
| 8,376,307 B2 | 2/2013 | Frolov |
| 9,156,486 B2 * | 10/2015 | Liu .................... B25H 1/0021 |
| 9,371,954 B2 * | 6/2016 | Lifshitz ................ B25H 1/04 |
| D924,282 S * | 7/2021 | Liu .............................. D15/133 |
| 2002/0011719 A1 | 1/2002 | Eskridge |
| 2004/0025759 A1 | 2/2004 | Lee |
| 2004/0187666 A1 | 9/2004 | Huang |
| 2005/0045781 A1 | 3/2005 | Brazell |
| 2005/0072493 A1 | 4/2005 | Velasco |
| 2005/0093258 A1 * | 5/2005 | Brazell .................. B25H 1/04 |
| | | 280/30 |
| 2005/0199768 A1 | 9/2005 | Tam et al. |
| 2007/0102892 A1 * | 5/2007 | Chiu ...................... B25H 1/04 |
| | | 280/35 |
| 2007/0199586 A1 * | 8/2007 | Cheng ................... A61H 3/04 |
| | | 280/87.021 |
| 2008/0115701 A1 | 5/2008 | Sugiura |
| 2009/0241811 A1 | 10/2009 | Markegard et al. |
| 2009/0289429 A1 | 11/2009 | Voong |
| 2010/0171290 A1 | 7/2010 | Wise |
| 2010/0213148 A1 * | 8/2010 | Chen ..................... B25H 1/04 |
| | | 211/85.8 |
| 2011/0297799 A1 * | 12/2011 | Frolov ................. B25H 1/005 |
| | | 248/121 |
| 2015/0069191 A1 * | 3/2015 | Filseth ................ B60N 2/2854 |
| | | 248/164 |
| 2019/0168794 A1 * | 6/2019 | Eyman ..................... B62B 9/28 |
| 2020/0376706 A1 * | 12/2020 | Dutterer ................. B27B 27/10 |
| 2022/0057021 A1 * | 2/2022 | Budziszek ............ F16B 7/0493 |

FOREIGN PATENT DOCUMENTS

| | | | | |
|---|---|---|---|---|
| EP | 1527848 A2 * | 5/2005 | | B25H 1/04 |
| EP | 1787766 A1 * | 5/2007 | | B25H 1/04 |
| EP | 1847358 | 10/2007 | | |

OTHER PUBLICATIONS

Craftsman table saw model No. CMXETAX69434502 instruction manual (Year: 2020).*

Ryobi 10 inch table saw model No. RTS12T operators' manual dated May 13, 2019, https://www.ryobitools.com/help-plus/details/33287181209 (Year: 2019).*

Bosch GTA500 Folding Stand for Table Saw sold on amazon, first available date: Mar. 29, 2011, https://www.amazon.com/Bosch-GTA500-Folding-10-Inch-Portable/dp/B004U91EOS (Year: 2011).*

Ridgid Model 300 Compact Threading Machine Catalog Sheet No. R-96-N, Ridge Tool Company, Aug. 1, 1997.

Craftsman 10 in. Table Saw Operator's Manual, Model No. 315.218290, Sears, Roebuck and Co., Jul. 15, 2005.

Portamate PM6700 Portable Miter Saw Stand Operators Manual, Portamate, 2014.

* cited by examiner

FOLDING STAND WITH SECURING MECHANISM

CROSS-REFERENCE TO RELATED APPLICATIONS

This application claims the benefit of and priority from U.S. Provisional Patent Application Ser. No. 63/072,405, filed Aug. 31, 2020, which is incorporated herein by reference.

FIELD

The present disclosure relates generally to folding stands, and more particularly to folding stands to support and secure a power tool.

BACKGROUND

An advantage of a compact power tool (such as a benchtop table saw) over its full-sized counterpart (such as a cabinet saw) is the space savings from utilizing a smaller tool. Another advantage is the portability of a smaller tool compared to a larger tool. But compact power tools, such as benchtop table saws, are often too small to conveniently use without elevating them off the ground to an appropriate work height. Accordingly, a stand is frequently used to elevate a compact power tool off the ground. The present disclosure shows a stand for a power tool, such as a benchtop table saw, that offers a secure and easy to use securing mechanism to hold the power tool to the stand.

DETAILED DESCRIPTION

Figure 1:
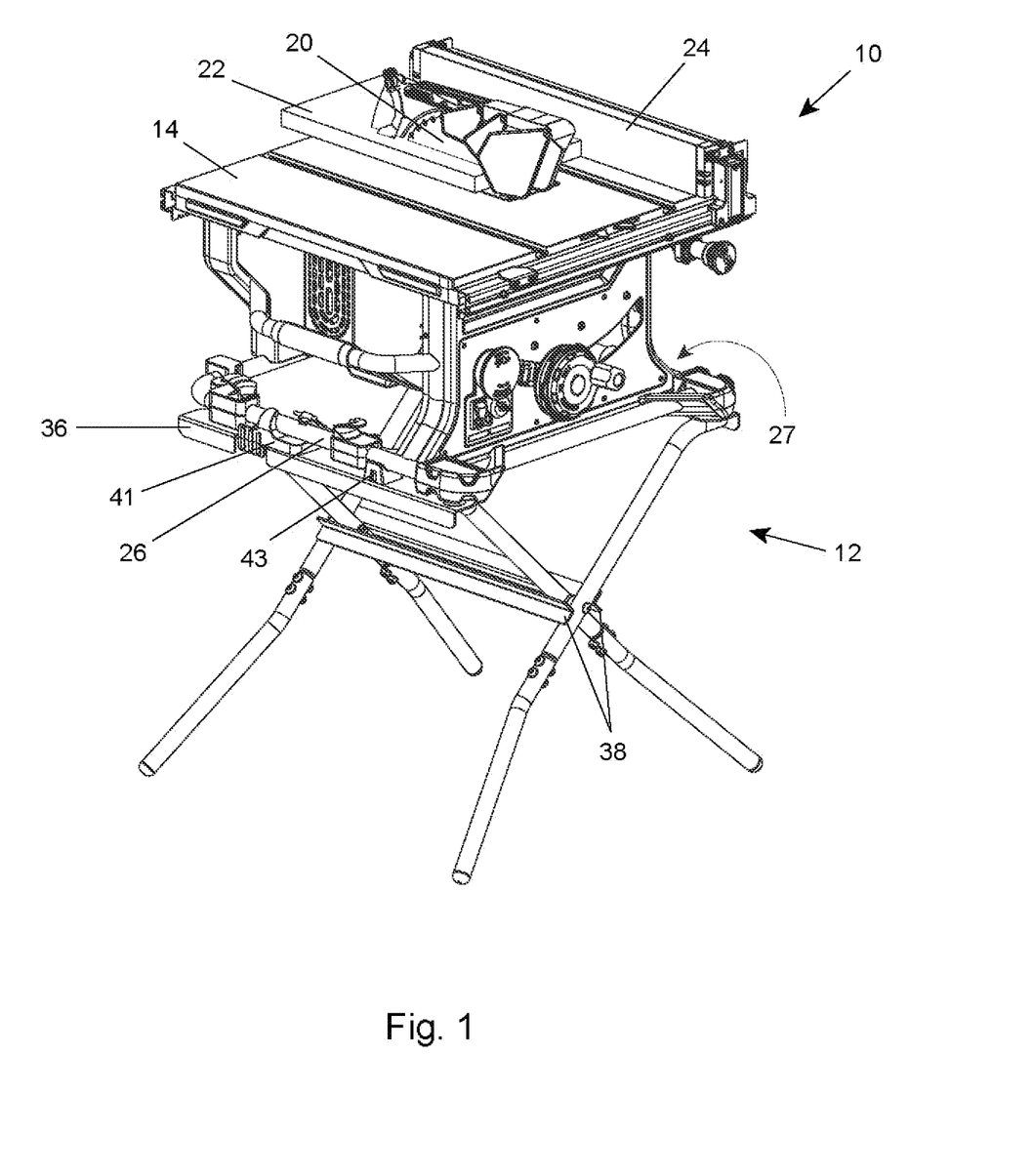
FIG. 1 shows a table saw secured to a foldable stand.

FIG. 1 shows a compact table saw or benchtop saw 10 installed on a foldable stand 12. Compact table saw 10 has a work surface 14, blade 20, and fence 24. The blade extends up above the work surface and a user slides a workpiece 22 on the work surface into contact with the blade to cut the workpiece. Fence 24 provides a flat surface parallel to the plane of the blade for workpiece 22 to abut and slide against when making cuts. In the disclosed embodiment, fence 24 is on the right side of blade 20.

Figure 2:
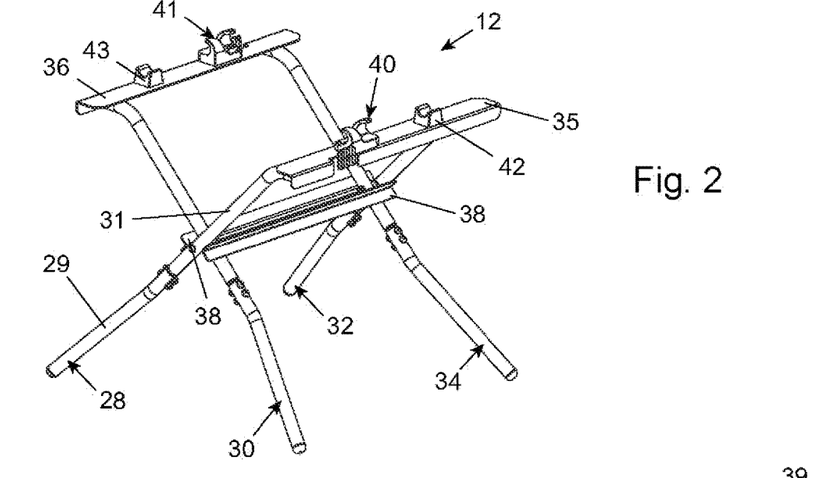
FIG. 2 shows the foldable stand of FIG. 1 without the table saw.

FIG. 2 shows foldable stand 12 isolated from the table saw. Foldable stand 12 includes legs 28, 30, 32, and 34. In the disclosed embodiment, legs 28, 30, 32, and 34 are each comprised of a top component, such as top component 31, and a bottom component, such as bottom component 29. The bottom component of each leg is bent to give the stand a wider base to increase the stability of the stand. Each leg's top component, for example top component 31, has an end that fits into each leg's bottom component, for example bottom component 29. When that end of the top component is fit into the bottom component, the two components are secured together by two bolts with nuts. Of course, other methods of securing the two components together can be used, such as a spring detent on one component that protrudes into a hole on the other component, or any other appropriate securement method known in the art. Alternatively, the legs could be made of a single component. In any event, this two-piece design allows the legs to be broken down into smaller components for shipping and storage.

Figure 4:
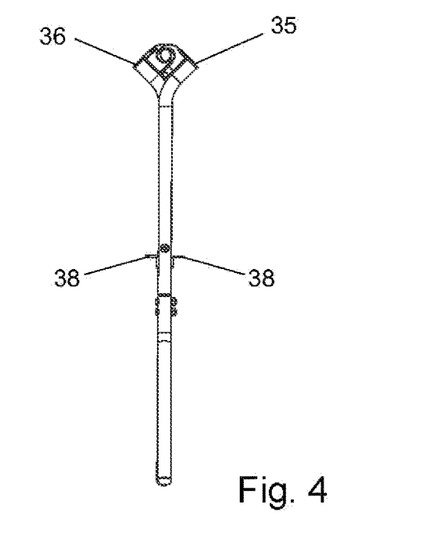
FIG. 4 shows the foldable stand in a folded position.

The stand's legs are configured to pivot, which allows the stand to be positioned in a folded configuration for storage, and an unfolded configuration for use. In the disclosed embodiment, legs 28 and 30 are pivotally joined to each other and legs 32 and 34 are pivotally joined to each other. The legs are joined by a bolt extending through both of the legs at a location near the middle of the legs. The bolt is fastened by a nut. Joining the legs in this manner allows the legs to pivot closed or, in other words, to fold together to create a smaller profile. The folded configuration is shown in FIG. 4. When the stand is in the folded configuration, the stand is nearly flat.

Figure 3:
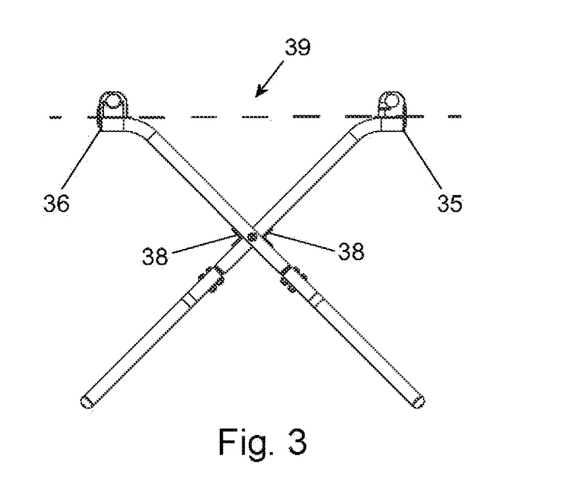
FIG. 3 is another view of the foldable stand.

Legs 28 and 32 support a rail 35 and legs 30 and 34 support a rail 36. Rail 35 and rail 36 in the disclosed embodiment are made from folded metal or angle iron (although other materials could be used) and are exact copies of each other. The legs are attached to the underside of the rails. The legs can be attached to the rails by any suitable method known in the art, such as by welding, or using screws or bolts. The legs are configured to support rails 35 and 36 so that both of the rails are in a horizontal plane 39, as shown by the dashed line in FIG. 3. In the disclosed embodiment the top surface of each rail is flat to provide a support surface for table saw 10, and those flat top surfaces define horizontal plane 39. The rails also provide horizontal stability for the stand and add to the rigidity of the stand. The rails can be sufficiently similar or even identical so that table saw 10 may be placed on and secured to the stand in the position shown in FIG. 1 or in a position where the table saw is rotated 180 degrees about a vertical axis from the position shown in FIG. 1. Having the rails be similar or identical is advantageous because it simplifies manufacturing and assembly, as well as the user experience.

Stand 12 also includes stretchers 38 attached to the legs to prevent the legs from opening more than intended when the stand is positioned in the unfolded configuration. In the disclosed embodiment, stretchers 38 are made from angle iron or bent sheet metal. The stretchers act as a physical stop for the legs to rest upon when the stand is positioned in the unfolded configuration, as shown in at least FIGS. 1, 2, and 3. The stretchers also provide support and rigidity to the stand.

Stand 12 further includes two securing mechanisms 40 and 41. Securing mechanism 40 is mounted to the top flat surface of rail 35 and securing mechanism 41 is mounted to the top flat surface of rail 36. Both of the securing mechanisms are identical. Securing mechanism 40 is shown isolated in FIGS. 5-8. In the disclosed embodiment, each securing mechanism is one integral piece made from plastic, though any number of appropriate materials could be used. The securing mechanisms are pivotally attached to the top surface of the rails by a bolt that extends through hole 49 in the securing mechanisms. The bolt also extends through the rail and is fastened with a nut or an alternative fastening method on the underside of the rail. The securing mechanisms are configured to pivot around the bolt about axis generally perpendicular to horizontal plane 39.

Figure 9:
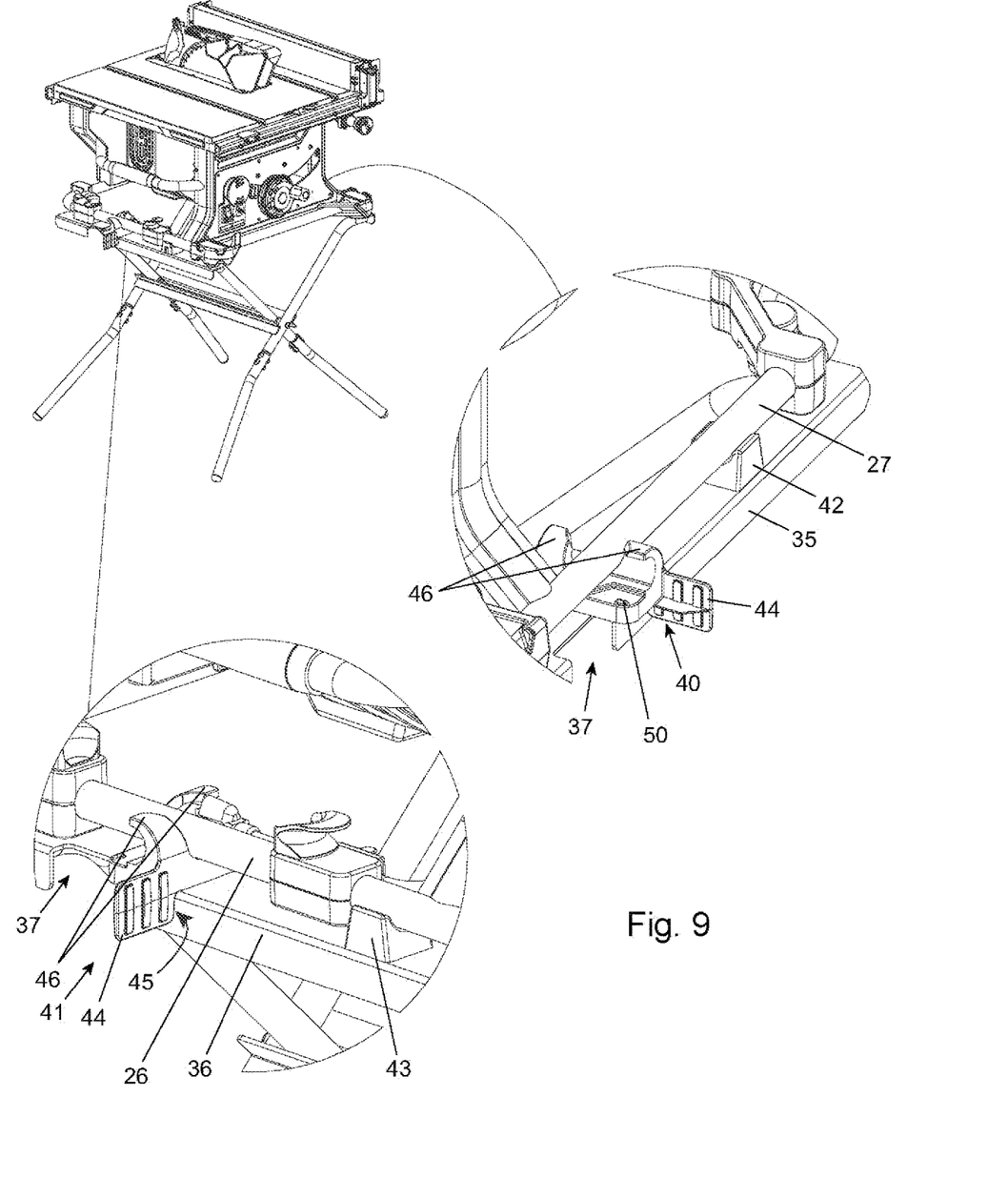
FIG. 9 shows the table saw on the foldable stand with close-up views of the securing mechanisms in an unlocked position.
Figure 10:
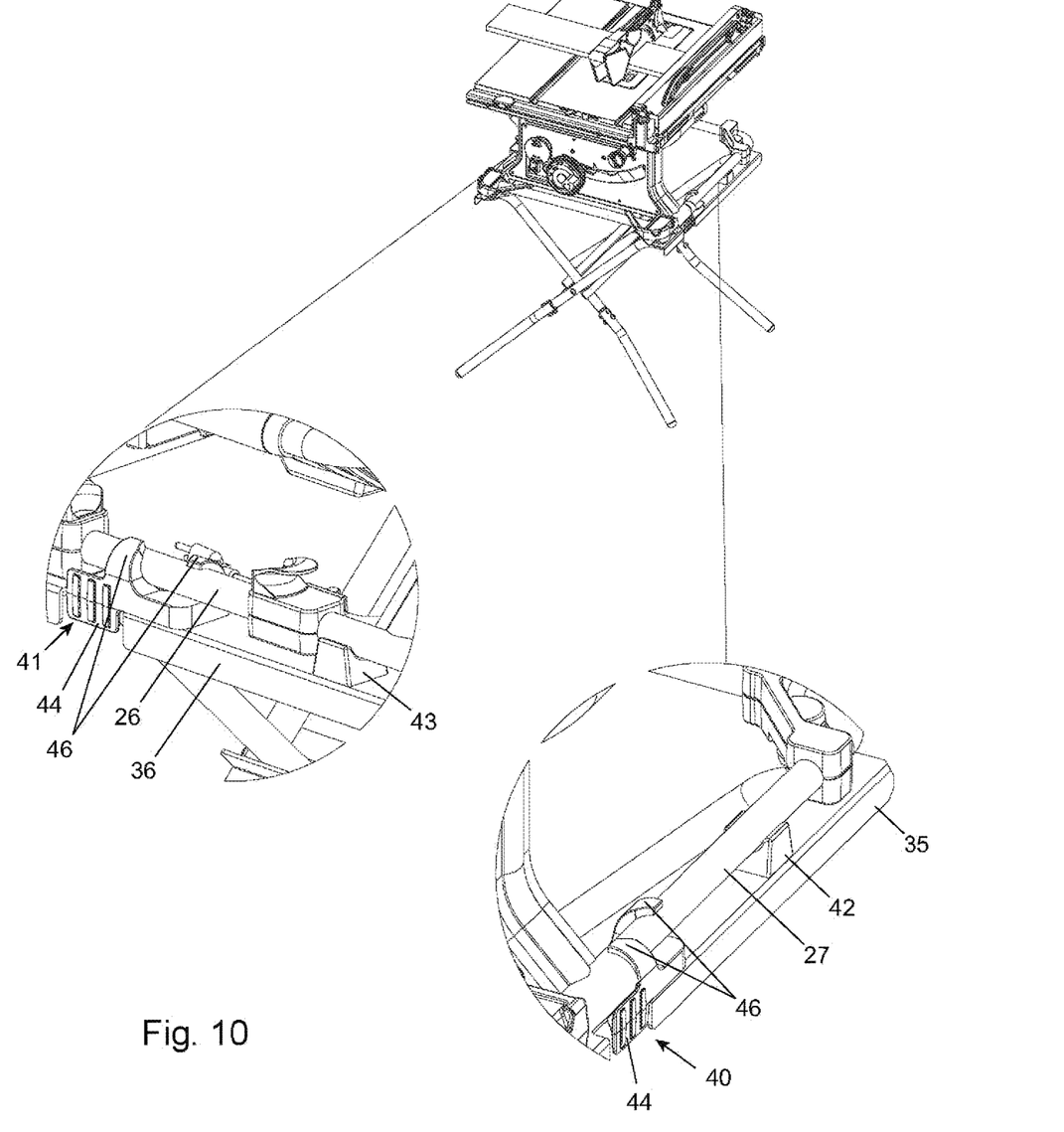
FIG. 10 shows the table saw on the foldable stand with close-up views of the securing mechanisms in a locked position.

Each securing mechanism includes a handle 44. Handle 44 allows the securing mechanisms to be pivoted by hand without the use of tools between a locked position and an unlocked position. In the unlocked position, handle 44 is perpendicular to the rail on which is it mounted, as shown in FIG. 9. Handle 44 includes a section 45 configured to abut the rail to prevent rotation of the securing mechanism beyond a predetermined amount, such 90-degrees, or less than 360 degrees. In the locked position, handle 44 is along the side of or parallel with the rail on which it is mounted, as shown in FIG. 10. In the depicted embodiment, to pivot one of the securing mechanisms 40 or 41 between its locked position and unlocked position, a user needs only to grasp handle 44 and pivot the securing mechanism 90 degrees. A cutout 37 in each of rails 35 and 36 provides adequate clearance for a user to grasp handle 44 when the securing mechanism is in the locked position. Handle 44 may be grasped from the top, bottom, or the distal end to pivot the securing mechanism.

Securing mechanisms 40 and 41 are configured to grip a portion of the power tool when pivoted to the locked position. As shown in FIG. 1, table saw 10 includes a frame member 26 that is part of a frame, housing, or base of the saw. In the depicted embodiment, frame member 26 is a cylindrical tube made of metal, plastic, or any suitable material, but it may be a solid rod or bar. A second similar frame member 27 is on the other side of the saw. In the disclosed embodiment, securing mechanism 40 grips frame member 27, and securing mechanism 41 grips frame member 26 when the securing mechanisms are in the locked position, as shown in FIG. 10. When the securing mechanisms are gripping the frame members, the frame members are secured to the stand and cannot move relative to the stand. This is accomplished by two curved arms 46 on each securing mechanism. The curved arms are configured to curve over and contact frame member 26 or 27 when the securing mechanism is in the locked position. As the securing mechanism is pivoted from the unlocked position to the locked position, curved arms 46 slightly deflect as they are forced over the frame member. This deflection biases the arms downward towards the frame member. In the locked position, the arms extend over the top of the frame member to prevent the frame member from being moved vertically. Side-to-side movement of the frame member is prevented by the arms of the securing mechanism abutting the sides of the frame member. A frictional force prevents the frame member from sliding along the length of the rails. The frictional force is caused by the downward bias of the arms. The downward bias and frictional force of the arms also prevent the securing mechanism from unintentionally pivoting to the unlocked position. While the disclosed embodiment of the securing mechanism includes two arms, the securing mechanism may alternatively be configured to include only one arm.

Figure 7:
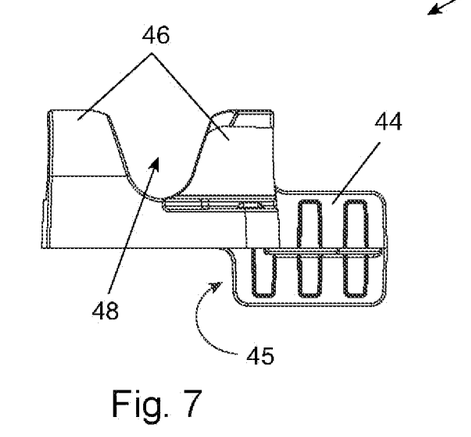
FIG. 7 is a side view of the securing mechanism.

Arms 46 are spaced apart so that a gap or channel 48 extends between the arms, as seen in FIG. 7. Channel 48 is configured to receive a portion of the power tool, such as frame member 26, when the securing mechanism is in the unlocked position. In other words, in the unlocked position, both securing mechanisms 40 and 41 present a receiving channel 48 to receive either frame member 26 or 27. Receiving channel 48 is generally U-shaped to help guide the frame member to the correct location.

Figure 8:
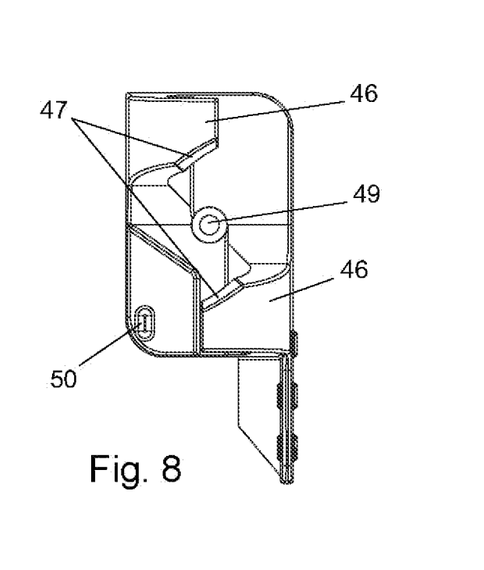
FIG. 8 is a top view of the securing mechanism.

Arms 46 also include cut-offs 47, best seen in FIG. 8, which allow room for frame member 26 or 27 to be placed in or removed from channel 48 when the securing mechanism is not fully in the unlocked position. In other words, cut-offs 47 allow the potential for a user to place the table saw on the stand or remove the table saw from the stand when one or both of the securing mechanisms are positioned slightly less than 90 degrees from the locked position. This is advantageous because a user does not have to ensure both securing mechanisms 40 and 41 are fully and perfectly in the unlocked position every time the user wants to place or remove table saw 10; the user simply has to have the securing mechanisms almost to the unlocked position.

Figure 11:
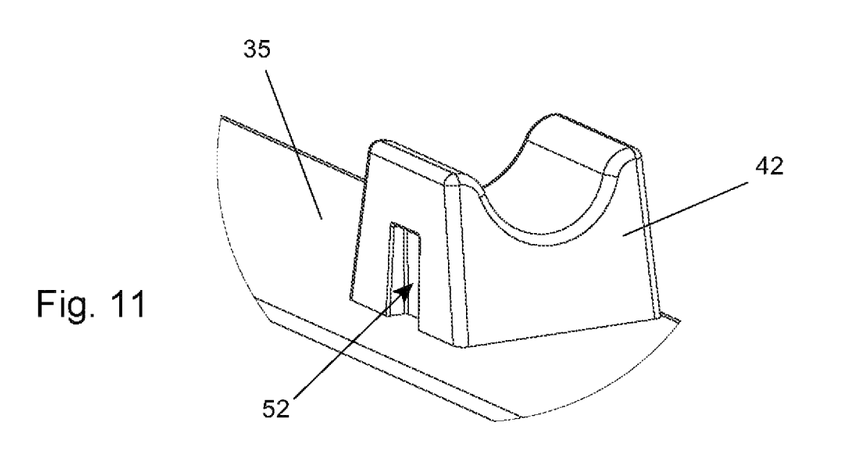
FIG. 11 is a drawing of a cradle.

Stand 12 may also include two identical cradles 42 and 43, which are configured to help guide frame member 26 into receiving channel 48. FIG. 11 shows a detailed view of cradle 42. Cradle 42 is attached to the top flat surface of rail 35, and cradle 43 is attached to the top flat surface of rail 36. Both cradles have a generally U-shaped upper surface that frame member 26 or frame member 27 rests upon. The cradles are also configured to abut a cord wrap attached to frame member 26. Having a cradle abut the cord wrap acts as a secondary means to prevent movement of the frame member along rail 36. Additionally, the cradles help prevent lateral movement of the object being secured to the stand. At least one of cradle 42 and cradle 43 could be replaced by an additional securing mechanism.

In practice, a user unfolds stand 12 and pivots securing mechanisms 40 and 41 to the unlocked position to present receiving channels 48. The user then places table saw 10 on the stand so that frame members 26 and 27 fit into receiving channels 48 in securing mechanisms 40 and 41. (As stated, the user can place the table saw on the stand in the position shown in FIG. 1 or rotated 180 degrees from the position shown in FIG. 1.) The user then grasps handles 44 and pivots securing mechanisms 40 and 41 to the locked position, wherein arms 46 curve over frame members 26 and 27 to firmly hold the frame members and secure table saw 10 to the stand. To remove table saw 10 from the stand, a user grasps handles 44 and pivots both securing mechanisms 40 and 41 from the locked position to the unlocked position. When pivoting the securing mechanisms from the locked position to the unlocked position, arms 46 are moved away from frame members 26 and 27 and no longer apply a securing force to the frame member. The user can then lift table saw 10 vertically out of receiving channels 48. The stand can then be folded for storage by pivoting the legs and bringing rails 35 and rail 36 together.

Figure 5:
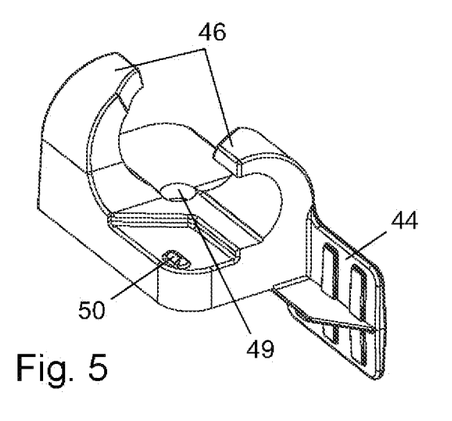
FIG. 5 is a drawing of a securing mechanism used to secure a power tool to the stand.
Figure 6:
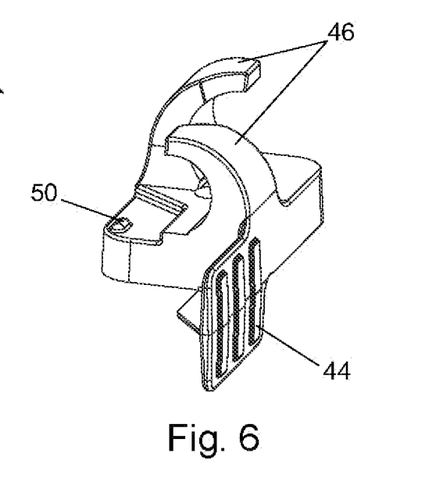
FIG. 6 is another view of the securing mechanism.

Foldable stand 12 can be configured to remain in the folded configuration. This is accomplished by detent 50 on securing mechanism 40 and detent groove 52 on cradle 42. These features are best seen in FIGS. 5 and 11, respectively. Detent 50 protrudes into detent groove 52 on cradle 42 which prevents the rails from moving independently of each other. Other appropriate securing methods known in the art may be utilized in place of or in addition to detent 50. Alternatively, the disclosed detent and detent groove may be removed entirely without affecting the main use of the stand.

INDUSTRIAL APPLICABILITY

The folding stand with securing mechanism disclosed herein is applicable to power tools, and particularly to compact table saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, the recitation of "a" or "a first" element, or the equivalent thereof, should be understood to include incorporation of one or more such elements, neither requiring nor excluding two or more such elements.

It is believed that the following claims particularly point out certain combinations and sub-combinations that are directed to disclosed inventions. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A stand for supporting an object, where the object includes a frame member, the stand comprising:
   a plurality of legs;
   first and second rails supported by the plurality of legs, where the first and second rails are positioned in a horizontal plane; and
   a securing mechanism attached to the first rail, where the securing mechanism is configured to pivot about an axis of rotation perpendicular to the horizontal plane, where the securing mechanism is configured to be pivoted by hand without the use of tools, where pivoting the securing mechanism less than 360 degrees secures the object to the stand, where the securing mechanism is configured to be pivoted between a locked position and an unlocked position, where the securing mechanism secures the object to the stand when in the locked position, where the securing mechanism is configured to grip the frame member in the locked position, where the securing mechanism includes at least one arm, and where the arm is configured to touch the frame member and deflect over the frame member when the securing mechanism is pivoted from the unlocked position to the locked position.

2. The stand of claim 1, where the securing mechanism includes two arms, and where the two arms are configured to touch the frame member and deflect over the frame member when the securing mechanism is pivoted from the unlocked position to the locked position.

3. The stand of claim 1, where the securing mechanism is a first securing mechanism, and further comprising a second securing mechanism attached to the second rail.

4. A stand for supporting an object, the stand comprising:
   a plurality of legs;
   first and second rails supported by the plurality of legs, where the first and second rails are positioned in a horizontal plane; and
   a securing mechanism attached to the first rail, where the securing mechanism is configured to pivot about an axis of rotation perpendicular to the horizontal plane, where the securing mechanism is configured to be pivoted by hand without the use of tools, where pivoting the securing mechanism less than 360 degrees secures the object to the stand, where the securing mechanism is configured to be pivoted between a locked position and an unlocked position, where the securing mechanism secures the object to the stand when in the locked position, where the securing mechanism includes two arms, where the two arms are configured to secure the object to the stand when the securing mechanism is in the locked position, where the securing mechanism presents a channel to receive a portion of the object when in the unlocked position, where the channel has two sides, where one arm is on one side of the channel and the other arm is on the other side of the channel when the securing mechanism is in the unlocked position, where the arms extend over the portion of the object when the securing mechanism is in the locked position, and where at least one arm includes a cut-off to provide room for the object to be placed in or removed from the channel.

5. A stand for supporting an object, the stand comprising:
   a plurality of legs;
   first and second rails supported by the plurality of legs, where the first and second rails are positioned in a horizontal plane; and
   first and second securing mechanisms, one attached to the first rail and one attached to the second rail, where each securing mechanism is configured to pivot about an axis of rotation perpendicular to the horizontal plane, where each securing mechanism is configured to be pivoted by hand without the use of tools, where pivoting each securing mechanism less than 360 degrees secures the object to the stand, where each securing mechanism is configured to be pivoted between a locked position and an unlocked position, and where the securing mechanisms are configured to secure the object to the stand when in the locked position without having to take further action to secure the object to the stand.

* * * * *